June 18, 1935.                S. B. GRISCOM                2,005,140
       MEANS FOR OBTAINING SERVICE CONTINUITY BY HIGH SPEED RECLOSING
                         Filed May 11, 1933

INVENTOR
Samuel B. Griscom.
BY O.B.Buchanan
ATTORNEY

Patented June 18, 1935

2,005,140

UNITED STATES PATENT OFFICE 2,005,140

MEANS FOR OBTAINING SERVICE CONTINUITY BY HIGH SPEED RECLOSING

Samuel B. Griscom, Swissvale, Pa., assignor to Westinghouse Electric & Manufacturing Company, East Pittsburgh, Pa., a corporation of Pennsylvania Application May 11, 1933, Serial No. 670,485

20 Claims. (Cl. 175—294)

My invention relates to the protection of transmission lines which are subject to self-clearing arcing faults of a type which automatically clear themselves on the removal of an arc-sustaining voltage therefrom. In such cases, important advantages can be obtained, as will be subsequently pointed out, if the line is reconnected in service very quickly after the disappearance of voltage thereon, so that, in most cases, the time of disconnection is such a small fraction of a second that there will be no interruption of the electrical service supplied by the transmission line to the customers, as distinguished from the old idea of reestablishing a service that has been interrupted.

My invention is an improvement on the reclosing circuit-breaker part of a patent granted February 28, 1933, to myself and others, No. 1,899,613, for Stable power systems with high-speed breakers and relays.

The present invention relates more particularly to reclosing systems utilizing a plurality of circuit breakers whereby higher speeds of operation may be obtained, as well as greater reliability. The present invention also involves the ideas of reclosing quickly, without stopping to measure the impedance of the line after the line has been deenergized from both ends, and also limiting the number of times that the circuit breakers are automatically reclosed on a fault which does not clear itself, thereby protecting the circuit breakers from ultimate failure.

Figure 1:
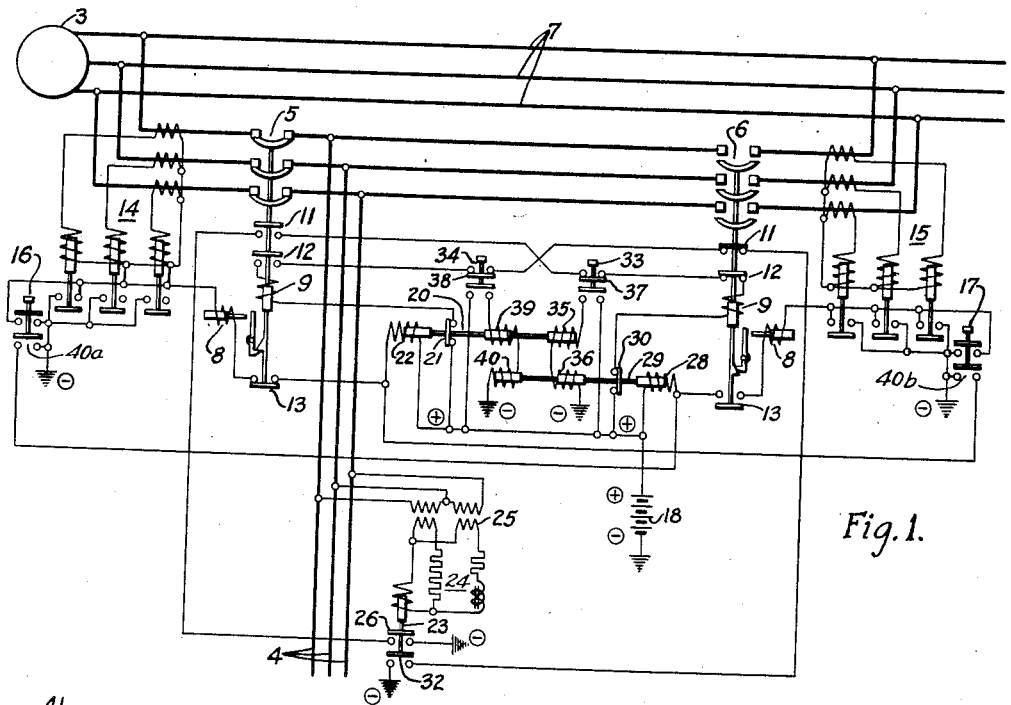
Figure 2:
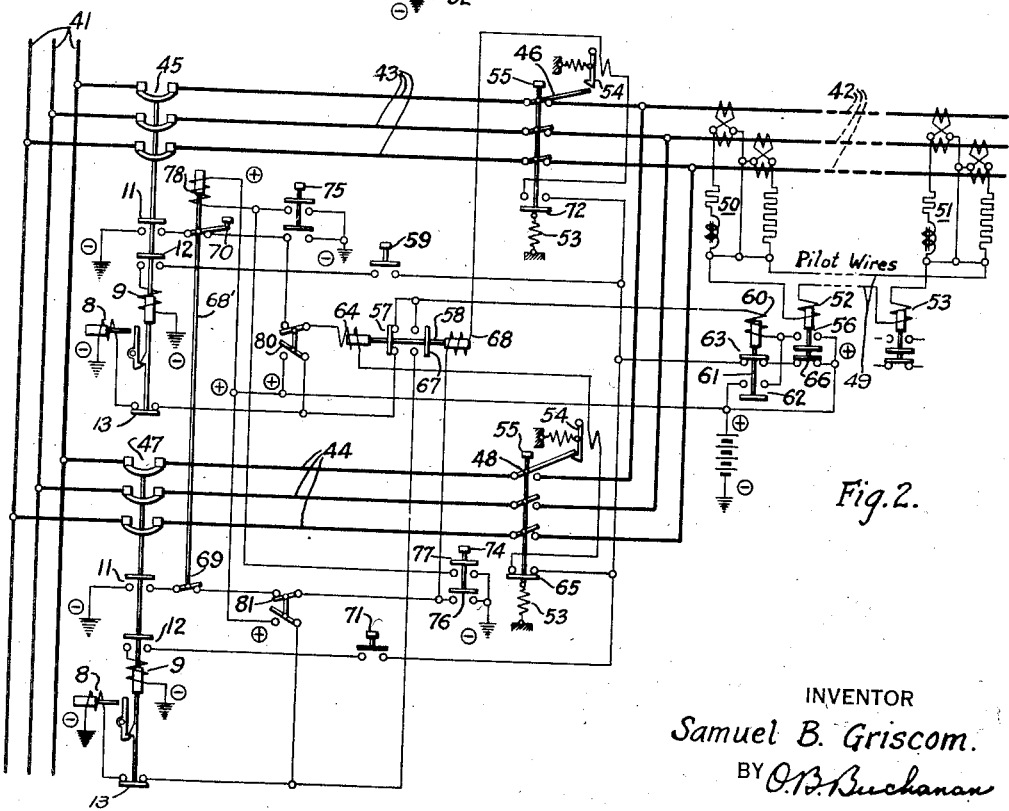

With the foregoing and other general objects in view, my invention consists in the apparatus, circuits, systems and methods hereinafter described and claimed, and illustrated in the accompanying drawing, wherein Figure 1 is a diagrammatic view of circuits and apparatus embodying my invention in one form of embodiment, and Fig. 2 is a similar view showing another form of embodiment of my invention.

Before discussing the theories and fields of applications of my invention, a brief description will first be given of two systems embodying the same.

Referring to Fig. 1, I have shown my invention applied to a portion of a three-phase synchronous transmission system embodying a generating station 3, a transmission line 4, and two circuit breakers 5 and 6, connected in parallel with each other and in series with the line, for energizing the line from the station bus 7. Each circuit breaker is provided with a tripping coil 8, a closing coil 9, and auxiliary contacts 11, 12 and 13 on the circuit breaker mechanism.

Two sets of high-speed over-current relays 14 and 15, respectively, are shown for energizing the tripping coils 8 of the respective circuit breakers 5 and 6, in response to currents of such magnitudes as to indicate the presence of a fault on the line 4. I have also shown two tripping pushbuttons 16 and 17 whereby the respective circuit breakers 5 and 6 may be tripped at the will of the station attendant.

The energization of the respective closing coils 9 of the circuit breakers 5 and 6 is ordinarily performed automatically. It is necessary to understand that in usual practice, only one of the circuit breakers 5 and 6 will be closed, the other circuit breaker being opened. In Fig. 1, the circuit breaker 5 is shown as being closed, while the circuit breaker 6 is opened.

Assuming that a fault occurs on the line 4, or that the tripping pushbutton 16 is depressed, the tripping coil 8 of the circuit breaker 5 will be energized from the negative terminal (—) of a battery 18, through the tripping pushbutton 16, or one or more of the over-current relays 14, to the tripping coil 8 and the auxiliary contact 13 on the circuit breaker, to the positive terminal (+) of the battery. When the circuit breaker opens, the auxiliary contact 13 opens the tripping circuit.

When the circuit breaker 5 is open, or partially open, the auxiliary contacts 11 and 12 are closed. The auxiliary contact 12 is connected in series with the closing coil coil 9 of the same circuit breaker 5, but this closing-coil circuit is open because of an auxiliary switch 20 which has a switch contact member 21 in series with the closing coil 9 of the circuit breaker 5. This auxiliary switch 20 is provided with an operating solenoid 22 which is serially disposed in the tripping circuit 8 of the circuit breaker 5 which has just been tripped. The effect of the energization of the operating solenoid 22 of the auxiliary switch 20 is to open the contacts 21 and make it impossible to reclose the circuit breaker 5 until the position of the auxiliary switch 20 is again changed, as will subsequently be described.

The other auxiliary contact 11, which closes when the circuit breaker 5 opens, is utilized to energize the closing coil 9 of the other circuit breaker 6, by means which will now be described.

The closing of the second circuit breaker 6 is made dependant upon the collapse of the voltage in the transmission line 4 being protected, and to this end I have shown a high-speed under-voltage relay 23 which is energized, through a positive-sequence network 24, from potential transformers 25 connected to the line 4. As soon as the voltage is removed from both ends of the line 4, it being understood that the equipment illustrated is duplicated at the other end of the line, the under-voltage relay 23 will drop, and the contact members 26 thereof will close a circuit from the negative terminal (—) of the battery 18, through the auxiliary contact 11 of the circuit breaker 5, and the auxiliary contact 12 of the circuit breaker 6, to the closing coil 9 of the circuit breaker 6 and thence to the positive terminal (+) of the battery 18. The circuit breaker 6 will thus begin to close and when it is closed, its auxiliary contact 12 will open and interrupt the current in the closing coil 9 thereof.

In a vast majority of cases, it will be found that a fault on the line has cleared itself, upon the cessation of voltage from the line, so that the second circuit breaker 6 will remain connected in service after it has been closed. In case, however, the fault still remains on the line 4, one or more of the over-current relays 15 will instantly pick up and energize the tripping coil 8 of the circuit breaker 6, thereby tripping out this breaker, and at the same time energizing an actuating coil 28 of an auxiliary relay 29, so as to open a switch contact member 30 which is in series with the closing coil 9 of the second circuit breaker 6, thereby making it impossible to reclose the second circuit breaker until a manually initiated adjustment has been made.

When the second circuit breaker 6 opens, the auxiliary contact member 11 thereof closes. It will be noted that this auxiliary contact member 11 of the circuit breaker 6 is connected in series with a contact member 32 of the under-voltage relay 23, so that, as soon as voltage disappears from the line 4, a circuit is started, from the negative battery terminal (—), through the under-voltage relay contact 32 and the auxiliary contact 11 of the second circuit breaker 6, and thence to the auxiliary contact 12 and the closing coil 9 of the first circuit breaker 5, and to the contact member 21 of the auxiliary switch 20 which now stands open, so that the closing coil 9 of the first circuit breaker 5 cannot be reclosed until the auxiliary switch 20 is reset.

The re-establishment of service through the line 4 must now be brought about by the intervention of the station attendant. When the latter individual desires to reconnect the line 4 to the station bus 7, he depresses either one of two closing pushbuttons 33 and 34, according as he desires to close the circuit breaker 5 or the circuit breaker 6 respectively. A depression of the closing pushbutton 33 brings about the energization of two solenoids 35 and 36, which are so associated with the respective auxiliary switches 20 and 29 as to reset both of them, closing their contacts 21 and 30, respectively. This closing pushbutton 33 is provided with back-contacts 37 which are opened when the pushbutton is depressed. These contacts are connected in the circuit of the closing coil of the second circuit breaker 6, so that only the first circuit breaker 5 is closed. The closing circuit of the latter circuit breaker 5, will then extend from the negative battery terminal (—), to the contact member 32 of the under-voltage relay 23, to the auxiliary contact member 11 of the second circuit breaker 6, to the back contact 38 on the second closing pushbutton 34, to the auxiliary contact 12 of the first circuit breaker 5, to the closing coil 9 of the first circuit breaker 5, to the contact member 21 of the auxiliary switch 20, and to the positive battery terminal (+).

If the station attendant had chosen to close the circuit breaker 6 rather than the circuit breaker 5, he would have depressed the closing pushbutton 34 instead of the closing pushbutton 33. The pushbutton 34 is connected to energize two solenoids 39 and 40 which are so disposed on the auxiliary switches 20 and 29 respectively as to reset or close the same.

It will be noted that neither tripping circuit for energizing the tripping coils 8 of the two circuit breakers can be energized unless the corresponding circuit breaker is closed, so that its auxiliary contact 13 is closed. It will further be noted that, whichever tripping circuit is energized, the corresponding one of the auxiliary switches 20 and 29 will be actuated, so as to open-circuit the closing-coil circuit of the same circuit breaker that has just been tripped, thereby preventing repeated operations.

It is expected that for about 90% of the faults, when one circuit breaker has been tripped and the other circuit breaker is closed, the latter will stay closed, because the fault has cleared itself. In such an event, it is expected that the station attendant will depress either one of the closing pushbuttons 33 or 34, so as to reset whichever one of the auxiliary switches 20 and 29 which has been actuated by reason of the tripping of one of the circuit breakers. It will be observed that the depression of either one of the closing pushbuttons 33 and 34 will have no effect whatsoever on either one of the closing-coil circuits of the two circuit breakers, if either one of the circuit breakers is already closed before the closing pushbutton is depressed.

When the station attendant desires to trip out a circuit breaker, such as the circuit breaker 5, for deenergizing the line 4 for repairs or other purpose, it is not desirable to automatically reclose the second circuit breaker, as 6; and to prevent this, the tripping pushbuttons 16 and 17 are provided with second contacts 40a and 40b which energize the opening coils 28 and 22, respectively, of the auxiliary switches 29 and 20.

The embodiment of my invention shown in Fig. 2 comprises a station bus 41 which is connected to a transmission line 42 by two parallel circuit-interrupting paths 43 and 44, respectively. The circuit-interrupting path 43 comprises circuit-interrupting means which include a circuit breaker 45 and a serially connected disconnect-switch 46. In like manner, the circuit-interrupting path 44 comprises circuit-interrupting means which include a circuit breaker 47 and a serially connected disconnect-switch 48.

In the embodiment shown in Fig. 2, means are provided for insuring that both ends of the transmission line 42 are tripped simultaneously in response to any fault occurring thereon, by which I mean that no matter how close the fault is to either end of the line-section, both ends will be tripped out at once, as distinguished from the sequential system in which the end closest to the fault is first tripped, and subsequently, after the first end has been entirely disconnected from the rest of the transmission system, the second end is tripped out. In the practice of my invention, it is important that both ends be always tripped out instantaneously and hence substantially simultaneously, because the reclosing of the circuit breakers cannot be brought about until both ends of the line section are disconnected from their sources of voltage, so as to put out the arc at the fault.

The simultaneous tripping of both ends of the line-section, under all fault conditions, usually involves some sort of pilot-wire connection or auxiliary communicating channel between the two ends of the line, because of the impossibility, with present relaying equipment, of accurately instantaneously determining the position of a fault which is close to the remote end of the line-section being protected, without any signal from the remote end. By way of illustration, I have indicated, in Fig. 2, a single pilot-wire communicating-channel 49 which joins two positive-sequence networks 50 and 51, which are located respectively at the near and remote ends of the line-section 42, said positive-sequence networks being connected to respond to the positive-sequence components of the line currents. Fault-responsive relays 52 and 53 are connected in series with the pilot wires 49, one relay at each end of the line, said relays being adapted to pick up when the positive-sequence current entering the line-section at one end is not substantially equal to the positive-sequence current leaving the line-section at the other end. The relaying system comprising the use of the positive-sequence networks with the pilot wires, as just described, constitutes the subject matter of an application of Edwin L. Harder, Serial No. 651,835, filed January 14, 1933, assigned to the Westinghouse Electric & Manufacturing Company.

Each of the circuit breakers 45 and 47 is provided, as before, with a tripping coil 8, a closing coil 9 and auxiliary contact members 11, 12 and 13. In the embodiment of my invention, shown in Fig. 2, both of the circuit breakers 45 and 47 will normally be closed, but one of the circuit breakers will normally be disconnected from the transmission line by means of its disconnect-switch 46 or 48 as the case may be. As shown in Fig. 2, the disconnect-switch 46 is closed, thereby causing energy to be supplied to the transmission line through the circuit breaker 45.

In accordance with my invention, as shown in Fig. 2, when the circuit breaker which is carrying current is tripped out, as a result of a fault, instead of closing the other circuit breaker, which may require considerable time, the other circuit breaker is already closed, so that all that is necessary to be done, in order to place said other circuit breaker in service, will be to close the other disconnect-switch. To this end, I equip the two disconnect-switches 46 and 48 with powerful springs 53 for quickly closing the same, and I hold these disconnect-switches open by means of electromagnetically releasable latches 54 which are automatically tripped in accordance with the desired operation. The disconnect-switches 46 and 48 are opened manually by means of suitable handles or knobs 55.

When a fault occurs on the line 42, the relays 52 and 53, at the two ends of the line, pick up. Considering only the operation produced by the relay 52, as the operation at the other end of the line is identical, this relay energizes a circuit from the positive battery terminal (+), through the relay contacts 56 of the relay 52, to a contact member 57 on a selector-switch 58, and thence to the auxiliary contact 13 and the tripping coil 8 of the circuit breaker 45 which is carrying current at the moment.

When the circuit breaker 45 opens, or is partially opened, its auxiliary contacts 11 and 12 both close. The auxiliary contacts 12 produce no effect because they are in series with a closing pushbutton 59.

The tripping circuit which is energized by the fault-responsive relay-contacts 56, also includes the operating coil 60 of a holding relay 61 having "make" contacts 62 and "break" contacts 63. The "make" contacts 62 serve to by-pass the fault-responsive relay-contacts 56 so as to hold or maintain the energization of the tripping circuit until the auxiliary contact 13 on the circuit breaker is finally opened, at which time the holding relay 61 opens, thereby opening its trip-circuit contacts 62 and closing its back-contacts 63, the purpose of which will shortly be described.

The auxiliary contacts 11 of the circuit breaker 45 complete a circuit from the negative battery terminal (−), through an operating coil 64 on the selector switch 58, to the latch 54 of the open disconnect-switch 48, and thence through back-contacts 65 on said disconnect-switch, from which the circuit is completed, through the back-contacts 63 of the holding relay 61, and also through back-contacts 66 on the fault-responsive relay 52, to the positive battery terminal (+).

The effect of including the back-contacts 63 of the holding relay in the latch-releasing circuit just described is to make sure that the circuit breaker 45 is open, or substantially open, as indicated by the opening of the auxiliary circuit-breaker contact 13, before the latch 54 of the disconnect-switch 48 is released. The effect of including the back-contacts 66 of the fault-responsive relay 52 in the latch-releasing circuit is to make sure that no fault current is flowing into the fault on the line, from either end of the line, before releasing the latch 54 of the disconnect switch 48. This last provision makes sure that voltage has been removed from both ends of the line before the line is restored to service by the release of the latch 54 which permits the disconnect switch 48 to snap closed under the influence of its closing spring 53.

The previously mentioned selector switch 58 is provided with two sets of contacts. When the previously mentioned contacts 57 are closed, the other contacts 67 are opened, and vice versa. The selector switch also has two operating coils, namely the previously mentioned operating coil 64 which is energized by the closure of the back-contacts 11 of the circuit breaker 45, and another operating coil 68 which is similarly energized by the closure of the back-contacts 11 of the other circuit breaker 47. The first operating coil 64 adjusts the selector switch so that the contacts 67 are closed, said contacts being included in the tripping circuit of the second circuit breaker 47. This means that the selector contacts 57 are opened, thereby killing the tripping circuit of the first circuit breaker 45.

The tripping of the latch 54 of the disconnect switch 48 reenergizes the line 42, and if the fault has meanwhile cleared itself, nothing further happens. If, however, the fault persists, or restrikes, the tripping relay 52 will instantly again be actuated, thereby again energizing the tripping circuit, which, however, is diverted, by means of the selector switch contacts 67, which are now closed, to the tripping coil 8 of the second circuit breaker 47. When this second breaker 47 opens nothing further happens because the disconnect-switch 46 is already closed. Both circuit breakers 45 and 47 will then be open, and the system will require the attention of the station attendant before the line 42 can be restored to service.

In order to make it possible for the station attendant to restore the apparatus of Fig. 2 to its initial condition, it is necessary first for him to manually open a double-pole switch 68', utilizing, for this purpose, a handle or knob 70. This switch kills the latch-releasing circuits of both of the disconnect-switches 46 and 48. The disconnect-switches must then be opened by hand, and ordinarily both of these switches will be opened and latched in their opened positions.

The operator then closes the two circuit breakers 45 and 47, utilizing, for this purpose two closing pushbuttons 59 and 71, respectively. The circuits for the two closing coils 9 of the circuit breakers 45 and 47 may now be traced from the positive battery terminal (+), through the back-contacts 66 of the fault-responsive relay 52 and the back-contacts 63 of the holding relay 61, from whence the circuit divides, one branch passing through the pushbutton 59 to the auxiliary switch 12 and the closing coil 9 of the first circuit breaker 45, the other branch passing through the pushbutton 71 to the auxiliary contacts 12 and the closing coil 9 of the second circuit breaker 47. The closing-coil circuits are finally interrupted by the opening of the auxiliary contacts 12 when the respective circuit breakers are closed.

The result of the foregoing operations is that both circuit breakers 45 and 47 are closed, in readiness for service, but neither circuit breaker is connected to the line 42 because both disconnect-switches 46 and 48 are open. When the station attendant desires to reconnect the line 42 into service, he trips out the latch 54 on either one of the disconnect switches 46 or 48, utilizing, for this purpose, either one of two latch-releasing pushbuttons 74 and 75, respectively.

A depression of the latch-releasing pushbutton 74 closes a circuit from the negative battery terminal (—), through the pushbutton contacts 76, to the operating coil 68 of the selector switch 58, and thence to the latch 54 of the disconnect switch 46, and on through the back-contacts 72 of this same disconnect switch, from which the circuit is completed through the back-contacts 63 of the holding relay 61 and the back-contacts 66 of the fault-responsive relay 52. The releasing of the latch 54 of the disconnect-switch 46 permits the latter instantly to snap closed, thereby supplying current to the line 42 through the circuit breaker 45, and at the same time opening the latch circuit by means of the opening of the back contacts 72 of the disconnect-switch. Meanwhile the operating coil 68 of the selector switch 58 has been momentarily energized, thereby adjusting the selector switch to the position shown in the drawing, in which the tripping circuit of the circuit breaker 45, which is associated with the disconnect switch 46 which has just been closed, is connected in the tripping circuit of the fault-responsive relay 52, so that said circuit breaker 45 will be the next circuit breaker to be tripped. in response to a fault on the line.

At the same time that the latch-releasing pushbutton 74 is depressed, as has just been described, a second contact member 77 carried by the pushbutton completes a circuit from the negative battery terminal (—) to a closing coil 78, which is operatively associated with the double-pole switch 69', so as to insure that the latter switch is closed, thereby restoring the two latch-circuits of the disconnect-switches 46 and 48 to the control of the respective auxiliary contacts 11 of the two circuit breakers 45 and 47, said circuit breakers being now closed, so that said auxiliary contacts 11 are both open.

If the other latch-releasing pushbutton 75 had been depressed, the other disconnect switch 48 would have been closed, and the selector switch would have been adjusted to its opposite position. Thus, the circuit breaker 47 would have been connected in service and the selector switch 58 would have been so adjusted that, when the fault-responsive relay 52 picks up, it would energize the tripping circuit of the circuit breaker 47 which would then be in service.

Assuming, now, that the circuits are as shown in Fig. 2, namely that the disconnect-switch 46 is closed and the disconnect-switch 48 is open, with both circuit breakers 45 and 47 closed, if a self-clearing fault now occurs on the line 42, the operative circuit breaker 45 will be tripped and the other disconnect switch 48 will instantly also be unlatched so that it will close and send current into the line 42 again through the second circuit breaker 47. If the fault has cleared itself, this second circuit breaker will remain in service. It is expected then, that the station attendant will reclose the first circuit breaker 45 by depressing the closing pushbutton 59.

If the station attendant desires to trip out either one of the circuit breakers 45 or 47 without producing any other changes in the circuit connections, he will operate the appropriate one of two knife-switches 80 and 81, respectively, the effect of which will be to energize the appropriate tripping-coil circuit of the circuit breaker which is to be opened, while at the same time killing the latch-releasing circuit which would otherwise be energized by the back contacts 11 of the opened circuit breaker.

A better insight will be obtained as to the working principles of my invention if I outline some of the design limits and some of the uses or fields of application of my invention.

It is customary to use two or more circuits when supplying electrical energy to substations, or interchanging energy between parts of interconnected systems. This is because of service-continuity requirements when one line is out of service, either temporarily because of a flashover, or over an extended period as for repairs. In most cases, this use of multiple circuits is necessary; in fact, the amount of load to be carried will frequently require more than one circuit.

If a fault, on such a multi-circuit transmission system, is cleared with sufficient rapidity, for instance, in a time of the order of 0.1 second, the stability limit of the system is materially increased, and approaches a limit determined by the carrying capacity of the system with the defective line circuit out of service, starting from an initial state of all lines in service; that is, the effect of the fault approaches that of a switching operation. The total energy which can be carried, as a result of such an operation, is considerably less than the carrying capacity which the system would have with all lines in service, because of the loss of the line which is in trouble reduces the capacity of the system after the fault has been cleared.

My present invention largely removes this difficulty by providing a high-speed reclosing system in connection with a high-speed opening system, so as to restore the system to the same condition in which it was before the fault. To illustrate, I will assume that a lightning discharge causes a transmission line to flashover. Power current follows this flashover and will persist until voltage is removed from the line. Therefore, I open the line by means of a suitable combination of high-speed relays and circuit breakers. Once the power-supply to the line, from both ends, has been interrupted, the line is immediately in condition for further service. Therefore, if the line is reclosed at high speed, it will be available for service, and in such short time that its loss has scarcely been felt by the system. Such operation contemplates a complete cycle of operation taking place in a time interval of the order of 0.25 second, sometimes more and sometimes even less. That is, the flashover occurs, the line is opened at both ends and then closed at both ends, in a total elapsed time of the order of 0.25 second. Thus the integrated influence of dropping the useful load-carrying capacity of the line for an exceedingly short period of time is insufficient to produce any very pronounced systemic effects, and the useful carrying-capacity of a power system having two transmission-line circuits in parallel approaches the sum of the carrying-capacities of both lines, rather than that of only one line.

There are cases, however, where the load requirements can be met by a single-circuit line, and in such cases, only one circuit would be built if reasonably satisfactory service could be maintained with the single circuit. Examples of such lines are radial feeders from substations or generating stations. On such lines or feeders, my quick-acting reclosing-circuit-breaker system is particularly useful, in order to give substantially uninterrupted service without the expense of duplicate service to each customer. The advantage of my invention in such a case rests upon three factors. One is, that with my high-speed reclosing system, the low-voltage releases which are commonly provided on motors and other utilization-devices in the customer's plants will not function, as a result of the fault. Another factor in favor of my high-speed reclosing system is, that where illumination is concerned, the eye notices only a flicker rather than the complete darkness of a service-interruption. A third factor, which is of prime importance in the case of transmission of power in places where only a single transmission-line circuit can be justified from economic considerations, is that, with my invention, it is usually possible to open and close the line sufficiently fast, in the event of a self-clearing fault thereon, to insure that the system does not fall out-of-step, thus producing a result which is the equivalent of the line not having been interrupted at all.

It is thus to be expected, in accordance with my invention, that it will be possible to maintain continuous service in spite of line-to-ground, line-to-line, and three-phase faults or short-circuits, provided that these short-circuits are not accompanied by physical line failures, such as conductor-breakage, insulator-failure, or an actual bridging of the line-conductors. The frequency of occurrence of physical line-failures varies considerably with the location and type of line construction, but may be kept low, probably well within one-tenth of all of the failures which occur on the line. My invention has no bearing, of course, on such physical line failures.

The factors affecting the feasibility of ordinary high-speed reclosing are (1) the maximum time available for a complete cycle of breaker-tripping and reclosing, (2) the minimum time within which it is possible to trip and reclose the breakers, (3) the time required for the arcing space at the fault to deionize so that the arc will not restrike when the breaker is reclosed, and (4) the probability of successive lightning strokes within the reclosing period.

The maximum time available for a complete cycle of breaker-tripping and reclosing is influenced by the system stability characteristics. The most important factors thereof are the overall reactance between the two ends of the transmission line, the inertias of the connected machines at the two ends, and the load transmitted over the line. Other factors are the reactances and short-circuit ratios of the various generators, the resistance and reactance of the line, the location and type of loads, the method of system-grounding, the location of the faults, and the type of the faults.

To secure successive automatic high-speed reclosing, without an interruption of service, it is necessary that the reclosure take place so quickly that the synchronism of the synchronous machines at the two ends of the line is maintained. Assuming the most severe case, in which the transfer of power between the two electrical systems at the two ends of the line ceases at the instant the short circuit occurs, the sending system will accelerate at a rate proportional to the power which was being transmitted over the line just before the occurrence of the fault, and inversely proportional to the inertia of the sending system. The receiving system decelerates at a rate proportional to the power which had been delivered to it and inversely proportional to its inertia. When the reclosure takes place, a fraction of a second later, the two systems will be somewhat out of phase and will be running at slightly different frequencies. The connecting circuit or transmission line must, therefore, have a power-limit sufficiently in excess of the normal load to overcome the momentum of the systems during the time they were disconnected.

Thus, the important stability factors are the transmitted load, the inertias of each system, and the power limit of the line. Calculations have shown that service interruptions may be prevented, by reclosures within the order of approximately 0.25 to 0.35 second, in many transmission systems, if the power being delivered by the tie-line just before the fault is of the order of 66%, or less, of the power-limit of the tie-line. If stability is to be maintained with transmitted loads much larger than this, the time of reclosure must, in general, be reduced considerably more.

In this connection, it may be noted that steam-turbine generators have a much higher inertia, or stored energy per kilowatt rating, than other forms of synchronous machines, so that systems having steam-turbine generators, at one or both ends of the transmission line, have a much better inertia factor, so that they are far more stable than systems having a smaller inertia. In general, the larger the systems which are interconnected by the transmission lines, the greater will be the permissible time within which to complete the cycle of breaker-tripping and reclosing.

The minimum time within which it is possible to trip and reclose the breakers is well within the limits which are available for the purpose of preventing service-interruption, particularly if no effort is made to reclose the circuit breaker which has tripped in response to the fault, the reclosing being accomplished by a parallel circuit-interrupting circuit, as described in connection with either Fig. 1 or Fig. 2 of the drawing. This is particularly true in the field of radial transmission lines, which usually operate at voltages of 11,000 to 66,000, in which a quick reclosing system, that recloses in from 12 to 37 cycles after the occurrence of a fault, assuming 60 cycle operation, would be particularly easy with circuit breakers for such low voltages.

The time required for the arc-space at the fault to deionize, so that the arc will not restrike when the breaker is reclosed, is found to be reasonably low, being something of the order of two cycles at 66,000 volts and 4½ cycles at 130,000 volts. It should be realized that the restriking of arcs is a random phenomenon, for which one may draw a probability curve, showing, for example, that in 32% of the cases, the arc will not restrike if the voltage is restored after two cycles, on a 66,000 volt line, whereas, if the voltage is not restored for 5 cycles, the probability is that, in not more than 9 percent of the instances will the arc restrike. The probability of restriking is approximately proportional to the voltage and is only slightly affected by even large variations in the arc-current. The probability of restriking is not materially effected by the spacing of the electrodes, provided that this spacing is above a certain minimum value, dependent upon the voltage, which is usually the case in transmission lines.

A better understanding of the phenomenon of the restriking of the arc can be had if consideration is given to the theory of its operation, so far as I understand the same. After the extinction of the arc, the gas in the arc-space remains ionized for a certain period of time. The free electrons become attached to molecules and thus form heavy negative ions. When voltage is applied to the arc-space shortly after the interruption of an arc, a space-charge forms about the electrodes, with most of the potential-drop occurring in these space-charge regions. The ions in the space between these space-charge regions slowly diffuse into the space-charge regions themselves and are carried to the electrodes. The current thus passing between the electrodes forms a so-called glow discharge. If the current in this discharge is excessive, it will increase rapidly and will soon transfer into an arc. If the current in this glow-discharge is small, it will decrease and finally cease. If the electrodes are sharp or very close together, corona may form at the electrodes and increase the probability of breakdown. Another concept is that the sharp electrodes force the glow current to concentrate, thus increasing the likelihood of forming an arc. This theory would indicate that practically the only voltage-gradient of any moment, in the entire arc-space, is in the regions close to the electrodes, so that the likelihood of a second breakdown is not materially effected by the total length of the arcing path, provided that this length is in excess of the length required by the two space-charge regions surrounding the electrodes.

The probability of successive lightning strokes within the reclosing period is another factor which, as noted above, affects the feasibility of automatically reclosing the transmission-line circuit at a high rate of speed. Of course, when a lightning-discharge occurs a second time, in the same region of the transmission line, a second fault will occur, and if this second lightning-stroke should occur during the short period of time between the opening and the closing of the circuit breakers, the arc would necessarily restrike and appear as a fault when the circuit breakers were reclosed. Rough estimates which have been made with the meager data at hand indicate that not more than 10 to 25% of the instances of faults caused by lightning would develop a restriking of the arc by reason of a repetition of the lightning stroke, in systems equipped with my rapid reclosing circuit-breaker system. Obviously, such conditions may be provided for by multiplying the number of parallel circuit-interrupting paths, such as the paths 43 and 44 of Fig. 2, or otherwise increasing the number of times that voltage is automatically quickly restored to the system before the reclosing mechanism is finally locked out. In general, with circuit breakers as at present constructed, it will be desirable, however, to avoid reclosing the same circuit breaker on itself for very many times, if at all, because of the increased danger of a failure of the circuit breaker itself as a result of the ionization produced by the arcs therein.

My invention is not limited, as will be understood, to any particular application, but its application to radial transmission lines of relatively low voltage is particularly important. In this connection, it may be noted that my reclosing circuit-breaker system avoids the necessity for the use of Petersen coils as a means for clearing faults. The Petersen-coil system involves the use of reactances in the ground circuits which connect the neutrals of the transformer with the ground, tuned in such a way as to, at least theoretically, cause the extinction of arcs between an individual line conductor and the ground. Such a system is considered, by many authorities, to be inapplicable or inadvisable in any large interconnected system, because it permits a 73% voltage-increase on the sound phase, and this increase in voltage spreads over all the system, for hundreds of miles, if the system is large, thereby subjecting many thousands of insulators, over a very wide area, to increased likelihood of flashover. Because of this, Petersen coils find practically their only field of application in radial transmission lines, which is one of the important fields of application of my invention, although my invention is by no means limited to such field, as is the case with Petersen coils. Moreover about 10 to 50% of the faults are double faults, for which the Petersen coil is useless, and a number of faults are simultaneous faults on all three phases. In all of these cases, my reclosing circuit-breaker system is applicable, to prevent service interruptions, and to permit the utilization of systems which are grounded without the use of Petersen coils.

I wish to emphasize the fact that my exceedingly fast reclosure system is a means for preventing service-interruptions, as distinguished from the old idea of automatically reclosing, where the reclosure took place after a relatively long time-interval after the opening of the breaker, being made for the purpose of restoring a service which has been definitely interrupted.

While I have illustrated my invention in only two forms of embodiment, it will be understood that the general principles and benefits thereof may be obtained in a number of different ways, and that various changes may readily be made, in the details of embodiment, by those skilled in the art. I desire, therefore, that the appended claims shall be accorded the broadest construction consistent with their language and the prior art.

I claim as my invention:

1. Relaying and switching means for the protection of a transmission line of a type subject to self-clearing arcing faults which clear themselves on the removal of an arc-sustaining voltage therefrom, said means comprising a plurality of energizing paths in parallel with each other and in series with the line, one side of said parallel energizing paths being bussed together and the other side being connected to an end of the line, circuit-interrupting means in each energizing path, fault-responsive means for actuating the respective circuit-interrupting means in response to fault conditions in the line, means for normally open-circuiting all but one of said parallel energizing paths, and means responsive to the actuation of the circuit-interrupting means in one of said parallel energizing paths for close-circuiting another one of said parallel energizing paths, the connections of the parallel- connected energizing-paths being such that the line suffers no voltage-reversal in making the change from one energizing-path to another.

2. Relaying and switching means for the protection of a transmission-line conductor of a type subject to self-clearing arcing faults which clear themselves on the removal of an arc-sustaining voltage therefrom, said means comprising normally closed switching means for energizing one end of said line conductor, normally open switching means connected in parallel to said first-mentioned switching means, said parallel switching means being bussed together on one side and connected to the line-conductor on the other side, means responsive to a fault on said line-conductor for automatically opening said first-mentioned switching means, means responsive to a deenergization of said line for subsequently automatically closing said second-mentioned switching means, and means responsive to a fault on said line-conductor for automatically opening said second-mentioned switching means and keeping the line open thereafter until a manually controlled resetting operation has been effected.

3. As a means for increasing the stability and/or continuity of service of an electrical system comprising synchronous machines and a power-transmitting line equipped with quick-acting circuit-interrupting means, quick-acting means for actuating said circuit-interrupting means to remove all voltage from the line in response to a fault thereon, quick-acting means responsive to the removal of all voltage from the line for automatically reconnecting said line to service, quick-acting means for again removing all voltage from the line in response to a fault thereon, and means for limiting the number of times the line is automatically reconnected to service in the event of a sustained fault, the quickness of action being such as to contribute materially to the stability and/or continuity of service of the electrical system as distinguished from a restoration of a definitely interrupted service.

4. As a means for increasing the stability and/or continuity of service of an electrical system comprising synchronous machines and a power-transmitting line equipped with quick-acting circuit-interrupting means, quick-acting means for actuating said circuit-interrupting means to remove all voltage from the line in response to a fault thereon, quick-acting means responsive to the removal of all voltage from the line for automatically reconnecting said line to service, and quick-acting means utilizing other circuit-interrupting means for again removing all voltage from the line in response to a fault thereon, and means for limiting the number of times the line is automatically reconnected to service in the event of a sustained fault, the quickness of action being such as to contribute materially to the stability and/or continuity of service of the electrical system as distinguished from a restoration of a definitely interrupted service.

5. As a means for increasing the stability and/or continuity of service of an electrical system comprising synchronous machines constituting sources of voltage at a plurality of spaced points, and a power-transmitting line joining said spaced points and equipped with quick-acting circuit-interrupting means at each end thereof, fault-responsive means for substantially simultaneously actuating said circuit-interrupting means so as to remove voltage from both ends of the line in response to any fault occurring thereon, quick-acting means for subsequently automatically reconnecting said line to service regardless of the line impedance, and quick-acting means for again removing voltage from both ends of the line in response to a fault immediately again appearing thereon, the quickness of action being such as to contribute materially to the stability and/or continuity of service of the electrical system as distinguished from a restoration of a definitely interrupted service.

6. Relaying and switching means for the protection of a transmission-line conductor of a type subject to self-clearing arcing faults which clear themselves on the removal of an arc-sustaining voltage therefrom, said means comprising a plurality of switching means, including one which is normally closed and one which is normally open and in parallel therewith, for energizing one end of said line conductor, said parallel switching means being bussed together one one side and connected to the line-conductor on the other side, means responsive to a fault on said line conductor for automatically opening said closed one of said parallel switching means, means responsive to the opening of said automatically opened switching means for automatically closing said normally open one of said parallel switching means after the deenergization of said line conductor, and means subsequently responsive to a fault on said line conductor for again deenergizing said line conductor.

7. Relaying and switching means for the protection of a transmission-line conductor of a type subject to self-clearing arcing faults which clear themselves on the removal of an arc-sustaining voltage therefrom, said means comprising normally closed switching means for energizing one end of said line conductor, normally open switching means connected in parallel to said first-mentioned switching means, said parallel switching means being bussed together on one side and connected to the line-conductor on the other side, means responsive to a fault on said line-conductor for automatically opening said first-mentioned switching means, means responsive to a deenergization of said line for subsequently automatically closing said second-mentioned switching means, and means responsive to a fault on said line-conductor for automatically opening said second-mentioned switching means.

8. As a means for increasing the stability and/or continuity of service of an electrical system comprising synchronous machines and a power-transmitting line equipped with quick-acting circuit-interrupting means, quick-acting means for actuating said circuit-interrupting means to remove all voltage from the line in response to a fault thereon, quick-acting means responsive to the removal of all voltage from the line for automatically reconnecting said line to service, and quick-acting means for again removing all voltage from the line in response to a fault thereon, the quickness of action being such as to contribute materially to the stability and/or continuity of service of the electrical system as distinguished from a restoration of a definitely interrupted service.

9. As a means for increasing the stability and/or continuity of service of an electrical system comprising synchronous machines and a power-transmitting line equipped with quick-acting circuit-interrupting means, quick-acting means for actuating said circuit-interrupting means to remove all voltage from the line in response to a fault thereon, quick-acting means responsive to the removal of all voltage from the line for automatically reconnecting said line to service, and quick-acting means utilizing other circuit-interrupting means for again removing all voltage from the line in response to a fault thereon, the quickness of action being such as to contribute materially to the stability and/or continuity of service of the electrical system as distinguished from a restoration of a definitely interrupted service.

10. An electrical system comprising synchronous machines and a power-transmitting line equipped with quick-acting circuit-interrupting means, quick-acting means for actuating said circuit-interrupting means to remove all voltage from the line in response to a fault thereon, quick-acting means responsive to the removal of all voltage from the line for automatically reconnecting said line to service, and quick-acting means for again removing all voltage from the line in response to a fault thereon, the quickness of action being such that the automatic reconnection is effected within not more than approximately 0.25 to 0.35 second after the occurrence of the fault.

11. An electrical system comprising a station bus, a power-transmitting line associated with said bus and equipped with quick-acting circuit-interrupting means, quick-acting means for actuating said circuit-interrupting means to remove all voltage from the line in response to a fault thereon, said last-mentioned means including means for effecting the disconnection of said line from said bus, quick-acting means responsive to the removal of all voltage from the line for automatically reconnecting said line to service, said last-mentioned means including means for effecting the reconnection of said line to the same bus, and quick-acting means for again removing all voltage from the line in response to a fault thereon.

12. An electrical system comprising a station bus, a power-transmitting line associated with said bus and equipped with quick-acting circuit-interrupting means, quick-acting means for actuating said circuit interrupting means to remove all voltage from the line in response to a fault thereon, said last-mentioned means including means for effecting the disconnection of said line from said bus, quick-acting means responsive to the removal of all voltage from the line for automatically reconnecting said line to service, said last-mentioned means including means for effecting the reconnection of said line to the same bus, and quick-acting means for again removing all voltage from the line in response to a fault thereon, the quickness of action being such that the automatic reconnection is effected within not more than approximately 0.2 to 0.6 second after the occurrence of the fault.

13. An electrical system comprising synchronous machines and a power-transmitting line equipped with quick-acting circuit-interrupting means, quick-acting means for actuating said circuit-interrupting means to remove all voltage from the line in response to a fault thereon, quick-acting means responsive to the removal of all voltage from the line for automatically reconnecting said line to service, and quick-acting means utilizing other circuit-interrupting means for again removing all voltage from the line in response to a fault thereon, the quickness of action being such that the automatic reconnection is effected within not more than approximately 0.25 to 0.35 second after the occurrence of the fault.

14. An electrical system comprising a station bus, a power-transmitting line associated with said bus and equipped with quick-acting circuit-interrupting means, quick-acting means for actuating said circuit-interrupting means to remove all voltage from the line in response to a fault thereon, said last-mentioned means including means for effecting the disconnection of said line from said bus, quick-acting means responsive to the removal of all voltage from the line for automatically reconnecting said line to service, said last-mentioned means including means for effecting the reconnection of said line to the same bus, and quick-acting means utilizing other circuit-interrupting means for again removing all voltage from the line in response to a fault thereon.

15. An electrical system comprising a station bus, a power-transmitting line associated with said bus and equipped with quick-acting circuit-interrupting means, quick-acting means for actuating said circuit-interrupting means to remove all voltage from the line in response to a fault thereon, said last-mentioned means including means for effecting the disconnection of said line from said bus, quick-acting means responsive to the removal of all voltage from the line for automatically reconnecting said line to service, said last-mentioned means including means for effecting the reconnection of said line to the same bus, and quick-acting means utilizing other circuit-interrupting means for again removing all voltage from the line in response to a fault thereon, the quickness of action being such that the automatic reconnection is effected within not more than approximately 0.2 to 0.6 second after the occurrence of the fault.

16. An electrical system comprising synchronous machines constituting sources of voltage at a plurality of spaced points, a station bus associated with said synchronous machines at each of two of said spaced points, and a power-transmitting line joining said two station buses and equipped with quick-acting circuit-interrupting means at each end thereof, fault-responsive means for substantially simultaneously actuating said circuit-interrupting means so as to disconnect both ends of the line from their associated buses in response to any fault occurring anywhere on said line between said buses, quick-acting means for subsequently automatically reconnecting said line to the aforesaid buses, respectively, and quick-acting means for again disconnecting both ends of the line from their associated buses in response to a fault immediately again appearing thereon.

17. An electrical system comprising synchronous machines constituting sources of voltage at a plurality of spaced points, a station bus associated with said synchronous machines at each of two of said spaced points, and a power-transmitting line joining said two station buses and equipped with quick-acting circuit-interrupting means at each end thereof, fault-responsive means for substantially simultaneously actuating said circuit-interrupting means so as to disconnect both ends of the line from their associated buses in response to any fault occurring anywhere on said line between said buses, quick acting means for subsequently automatically reconnecting said line to the aforesaid buses, respectively, and quick-acting means for again disconnecting both ends of the line from their associated buses in response to a fault immediately again appearing thereon, the quickness of action being such that the automatic reconnection is effected within not more than approximately 0.25 to 0.35 second after the occurrence of the fault.

18. As a means for increasing the stability of an electrical system comprising synchronous machines constituting sources of voltage at a plurality of spaced points, a station bus associated with said synchronous machines at each of two of said spaced points, and a power-transmitting line joining said two station buses and equipped with quick-acting circuit-interrupting means at each end thereof, fault-responsive means for substantially simultaneously actuating said circuit-interrupting means so as to disconnect both ends of the line from their associated buses in response to any fault occurring anywhere on said line between said buses, quick-acting means for subsequently automatically reconnecting said line to the aforesaid buses, respectively, and quick-acting means for again disconnecting both ends of the line from their associated buses in response to a fault immediately again appearing thereon, the quickness of action being such as to contribute materially to the stability of the system.

19. In an electrical transmission system having a source of electrical energy and a load circuit adapted to be energized therefrom, switching equipment comprising a plurality of switch-means circuits connected in parallel with each other and in series with said load circuit between said load circuit and said source, all but one of said parallel-connected switch-means circuits being normally open-circuited, trip-circuit means for effecting an opening of the closed switch-means circuit, fault-responsive means for energizing said trip-circuit means in response to a fault on the load circuit, and means jointly responsive to the energization of said trip-circuit means and the actual disappearance of arc-sustaining voltage on the load circuit for closing a normally open-circuited switch-means circuit between said load circuit and said source, but only when both of said two last-mentioned joint responses are obtained.

20. The invention as defined in claim 19, characterized by said normally open-circuited switch-circuit means which is closed by said joint response comprising a normally closed heavy-duty circuit-interrupter capable of safely interrupting fault currents and a serially connected, normally open, light-duty disconnect switch incapable of safely interrupting fault currents but easier to close quickly than said heavy-duty circuit-interrupter, the jointly responsive closing means operating on said disconnect switch to cause the same to be closed, and means responsive to a second fault indication for effecting the opening of said heavy-duty circuit-interrupter.

SAMUEL B. GRISCOM.